United States Patent
Nordquist et al.

(10) Patent No.: US 6,609,851 B2
(45) Date of Patent: *Aug. 26, 2003

(54) DEVICE FOR COUPLING A WORK PIECE TO A MACHINE TOOL

(75) Inventors: Hakon Nordquist, Täby (SE); Dan Holm, Tyresö (SE); Hans Hellman, Huddinge (SE); Peter Fröberg, Solna (SE)

(73) Assignee: System 3R International AB, Vällingby (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/461,715

(22) Filed: Dec. 16, 1999

(65) Prior Publication Data

US 2002/0071717 A1 Jun. 13, 2002

(30) Foreign Application Priority Data

Dec. 16, 1998 (DE) ........................................ 198 58 159

(51) Int. Cl.$^7$ ........................ B23Q 16/08; B23Q 1/08; B23Q 3/00
(52) U.S. Cl. ...................... 403/279; 403/13; 403/14; 403/409.1; 269/309
(58) Field of Search ..................... 403/13, 279, 373, 403/375, 14, 409.1; 269/309, 310, 19, 69

(56) References Cited

U.S. PATENT DOCUMENTS

| | | | | |
|---|---|---|---|---|
| 3,123,352 A | * | 3/1964 | Mendola ................ | 269/254 R |
| 4,610,020 A | * | 9/1986 | La Fiandra ............. | 269/309 X |
| 4,615,688 A | * | 10/1986 | Schneider ................ | 403/13 X |
| 4,838,533 A | * | 6/1989 | Buchler .................. | 269/310 X |
| 4,855,558 A | | 8/1989 | Ramsbro | |
| RE33,249 E | | 7/1990 | Schneider | |
| 5,065,991 A | * | 11/1991 | Schneider ................ | 269/309 |
| 5,791,803 A | | 8/1998 | Nordquist | |
| 6,036,198 A | * | 3/2000 | Kramer ................... | 403/13 X |
| 6,089,557 A | | 7/2000 | Obrist | |
| 6,160,236 A | | 12/2000 | Nordquist | |
| 6,176,636 B1 | * | 1/2001 | Stevenson et al. ........ | 403/13 |
| 6,336,767 B1 | * | 1/2002 | Nordquist et al. ........ | 403/353 |

FOREIGN PATENT DOCUMENTS

| | | | | |
|---|---|---|---|---|
| DE | 3516796 A | * | 11/1986 | ................ 403/13 |
| EP | 0 694 364 | | 1/1996 | |
| GB | 2082098 A | * | 3/1982 | |
| SU | 868147 A | * | 10/1981 | ................ 403/13 |

* cited by examiner

Primary Examiner—Lynne H. Browne
Assistant Examiner—Ernesto Garcia
(74) Attorney, Agent, or Firm—Jacobson Holman PLLC

(57) ABSTRACT

Disclosed is a coupling device having two coupling parts and clamping means for releasably axially clamping both coupling parts. A plurality of circumferentially spaced non parallel grooves are cut into the surface of one of both coupling parts for having a reference in a plane perpendicular to the clamping direction. Pins project from the surface of the other coupling part each pin having two opposing parallel lateral surfaces for obtaining alignment of the grooves with the pins upon clamping. At least one of the lateral surfaces of each pin forms an angle with the associated flank of each groove upon axial alignment of the coupling parts. For improving the repeated precision of the positioning of one of the coupling parts relative to the other coupling part even upon high stress on one of the coupling parts in circumferential direction a clamping plate is provided between the lateral surface and the associated flank which is axially elastic and is mounted to one of the coupling parts.

12 Claims, 5 Drawing Sheets

DEVICE FOR COUPLING A WORK PIECE TO A MACHINE TOOL

BACKGROUND OF THE INVENTION

1. Field of the Invention

The invention refers to a coupling device having two coupling parts and clamping means for releasably axial clamping of both coupling parts. A number of non parallel grooves spaced circumferentially are provided within one of both coupling parts as a reference system in a plane perpendicular to the clamping direction. Pins projecting from the surface of the other coupling part and having two opposing lateral surfaces are provided. At least one of the lateral surfaces of each pin includes an angle with the clamping direction.

2. Description of Related Art

In case one of the coupling parts is connected to the head of a machine tool, e.g. an EDM machine, and the other coupling part supports a work piece to be worked upon by the machine, the work piece may be positioned relative to the machine with very high precision within a plane (x-y-plane) perpendicular to the clamping direction (z-direction). The positional deviation amounts to only a few μm even after a very great number of clamping procedures and releasing procedures for the work piece and its coupling part. Such high position is achieved with a coupling device according to EP-A-722 809 (=U.S. Pat. No. 5,791,803) by creating a force acting circumferentially upon the coupling part during clamping.

A counterforce created when machining the workpiece, e.g. when producing a deep recess within the work piece by a lathe, may counteract to such force which may impair maintaining the close positional tolerance.

SUMMARY OF THE INVENTION

The invention therefore is based on the object to improve the repeatability precision of the positioning of one coupling part relative to the other coupling part under high load of one of the coupling parts in circumferential direction.

To this end the invention provides for a coupling device according to the above-mentioned type within which at least one clamping plate is disposed at one of the coupling parts such that during clamping it is clamped between one of the lateral surfaces of one of the pins and a flank of a groove cooperating with the pin for obtaining the desired adjustment of both coupling parts. The coupling device according to the invention allows therefore not only for an excellent repeatability of the precise positioning of the coupling parts with respect to each other but exhibits substantial stiffness of the alignment under heavy load which is limited only by the compressibility of the material of the clamping plate.

In a preferred embodiment of the invention the clamping plate is fixedly connected to the coupling part and preferably is integral therewith. Advantageously the clamping plate has a first section extending parallel to the clamping direction, and a second axially elastic section mounted to the associated coupling part.

In an aspect of the invention two clamping plates are provided the second sections of which are combined by a connecting base to form an overall U form configuration. According to one embodiment the base is mounted to a pin of a coupling part from which said pin projects. In an alternative the base is mounted to the bottom of a groove in a coupling part into which the grooves are cut. To this end the bottom may have a projection to which the base is mounted centrally.

According to another aspect of the invention the groove may be extended inwardly and laterally by an undercut. In such case the clamping plate may be made by driving a cut into the body of the coupling part such that the first section of the clamping plate extends in clamping direction and the elastic second section thereof extends transversely into the undercut.

Releasing the clamped coupling parts is simplified if according to another aspect of the invention the flanks of the grooves and/or the pins and/or the clamping plates are provided with hardened surfaces.

BRIEF DESCRIPTION OF THE DRAWINGS

The invention is hereinafter described in detail with reference to the attached drawings with show some embodiments of the invention.

DESCRIPTION OF THE PREFERRED EMBODIMENTS

Figure 1:
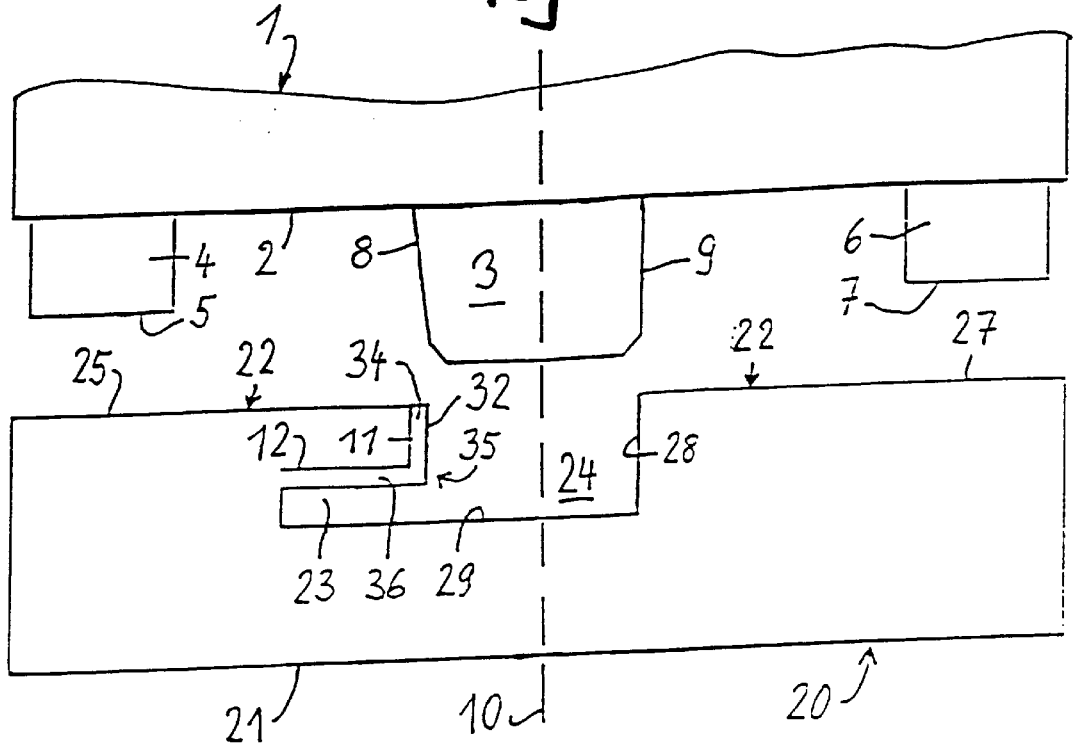
FIG. 1 shows a schematic representation of a first embodiment of a coupling device, the coupling parts being separate from each other.

The first coupling part 1 from which only the front section is represented may be mounted centrally to a not shown spindle head of a lathe. Normally, three posts of same length and equally spaced in circumferential direction project from the free end surface 2 of the coupling part 1. In the drawings only two posts 4, 6 are shown. The end surface 5, 7 of each post 4, 6 is made plane. All end surfaces 5, 7 extend within one common x-y-plane which is perpendicularly to the rotational axis 10 usually designated as z-axis. All posts are arranged around the z-axis along an imaginary circle The flat surface 22 of the removable coupling part 20 has areas 25, 27 which are arranged in correspondence with the arrangement of the posts 4, 6 of coupling part 1 and are made such that all areas extend within a common x-y-plane. Thus, clamping of coupling parts 1, 20 is performed when under the influence of the not shown clamping means all surfaces 5, 7 abut all the corresponding areas 25, 27.

A not shown axial and central throughbore is provided in the center of the coupling part 1 for allowing passage of a drawbar which is a portion of usual clamping means for both coupling parts.

Approximately in the middle in circumferential direction between adjacent posts a pin 3 projects from the end surface 2 in z-direction and has a length which is a little bit greater than the length of each of the posts 4, 6. The pin 3 is provided with a prismatic and hardened reference surface 8 which extends parallel to a radius of the imaginary circle. Similar reference surfaces are provided on everyone of the not shown further pins at the positionally same side thereof. Thus, reference surface 8 includes a small angle with the z-axis 10.

The second removable coupling part 20 is adapted to support a not shown work piece to be machined by the lathe or a similar machine tool to which the first coupling part is mounted, the work piece being fixed to the underside 21 of the second coupling part 20.

In circumferential direction equally spaced grooves each extending parallel to a radius of the imaginary circle, are cut into the upper side 22 of the second coupling part 20. The number of grooves equals the number of pins 3. In the drawing only the groove 24 is shown which faces the pin 3 upon clamping. It may be noted that all grooves are formed similarly to the groove 24 so that only the latter is described in detail. The groove 24 has two opposing flanks 28, 32 extending parallel to the radius. Flank 28 is associated to a lateral surface 9 of pin 3 which is opposite to the reference surface 8 with respect to pin 3. Flank 32 is associated to reference surface 8. Opposite to the flank 28 the groove 24 is extended laterally and inwardly by an undercut 23 the bottom of which is flush with the bottom 29 of the groove. An incision 11 made e.g. by an electric erosion wire is cut into the coupling part 20 in proximity to the flank 32 of the groove 24. The depth of the incision 11 is made over a substantial portion of the depth of the groove and is turned by a rectangular angle in form of a cut 12 which extends substantially parallel to the upper side 22. As shown the cut 12 terminates in proximity to the lateral end of undercut 23. Thereby, the flank 32 facing flank 28 of the groove 24 is formed to a clamping plate 35 integral with coupling part 20 which has a somewhat angular cross-section. Thus, the clamping plate has an upper first section 34 extending substantially parallel to the z-direction, and an adjoining second section 36 extending substantially transverse to the z-direction along the undercut 23. So the second section 36 is axially elastic because of its connection to the coupling part 20 at one end thereof. Thus, first section 34 is movable axially elastically and substantially parallel to flank 28, i.e. in z-direction.

Figure 2:
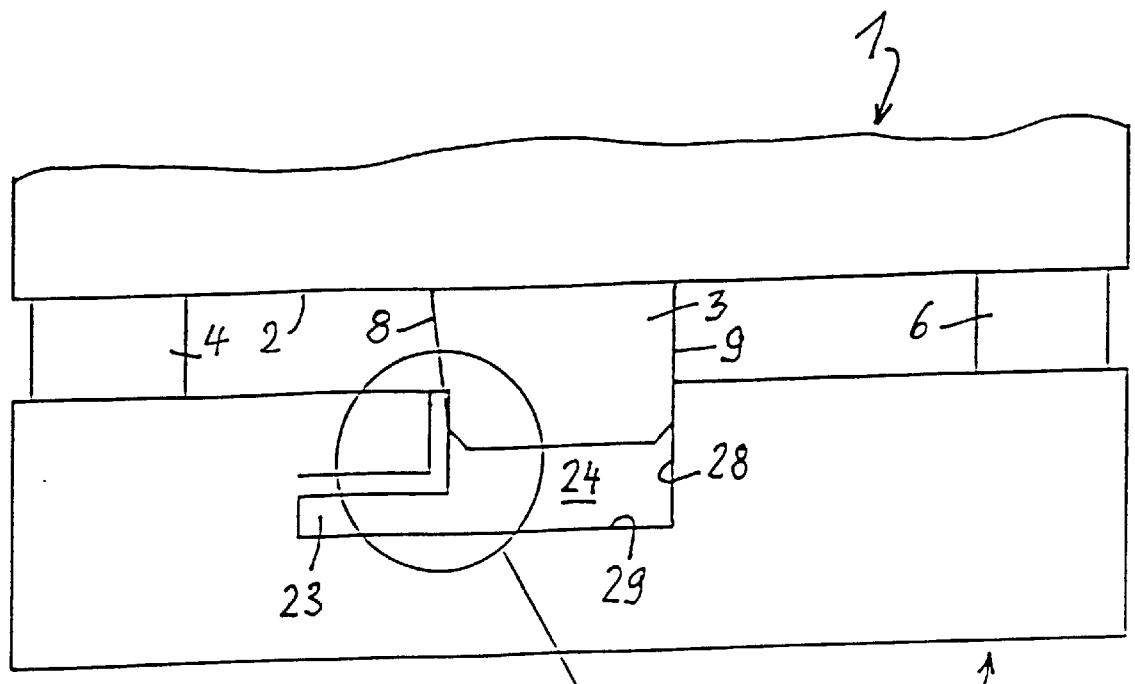
FIG. 2 a schematic representation of the first embodiment wherein the coupling parts are clamped.
Figure 2:
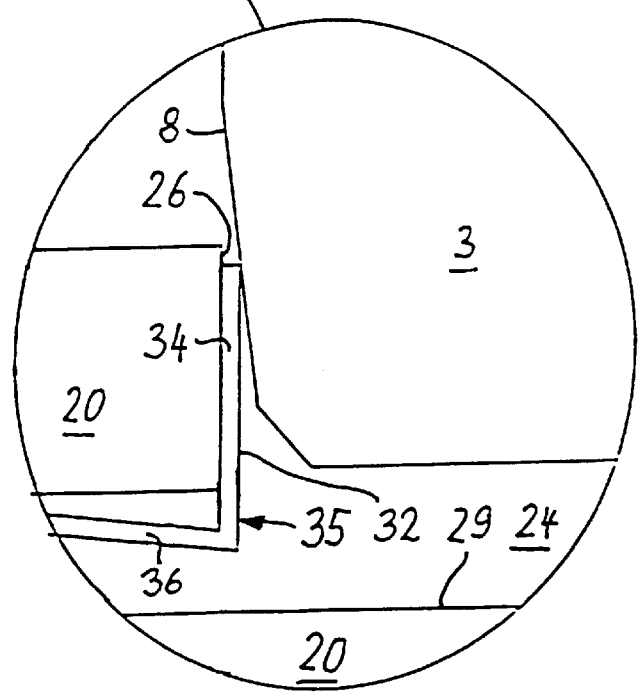

In the course of clamping both coupling parts 1, 20 by the not shown clamping means the pin 3 penetrates the groove 24 until the reference surface 8 engages the upper free edge of the clamping plate 35. Simultaneously an adjustment of the second coupling part 20 relative to the first coupling part 1 is obtained within the x-y-plane. Upon further tightening the clamping means pin 3 continues to penetrate the groove 24 and pushes downwardly the clamping 35 according to the enlarged detailed representation of FIG. 2 thereby bending inwardly the second section 36 of the clamping plate 35 into the space of the undercut 23. In the course of such downward pushing the pin 3 will clamp the clamping plate 35 substantially at that instant when the end surfaces 5, 7 abut areas 25, 27.

The adjustment of the coupling part 20 relative to coupling part 1 within the x-y-plane after clamping will be kept also in the event a very high force is applied to the coupling part 20 in both circumferential directions. The abutment of lateral surface 9 to flank 28 after adjustment takes place without elasticity because no elastic member is coupled inbetween. Moreover, the clamping of the reference surface 8 to the clamping plate 35 does not exhibit any lateral yield because the clamping plate 35 is elastic only in z-direction and incompressible in circumferential direction.

Both flanks 26 and 32 have hardened surfaces in order to ease release of the clamped coupling parts and to improve the axial yield of the clamping plate 35.

Figure 3:
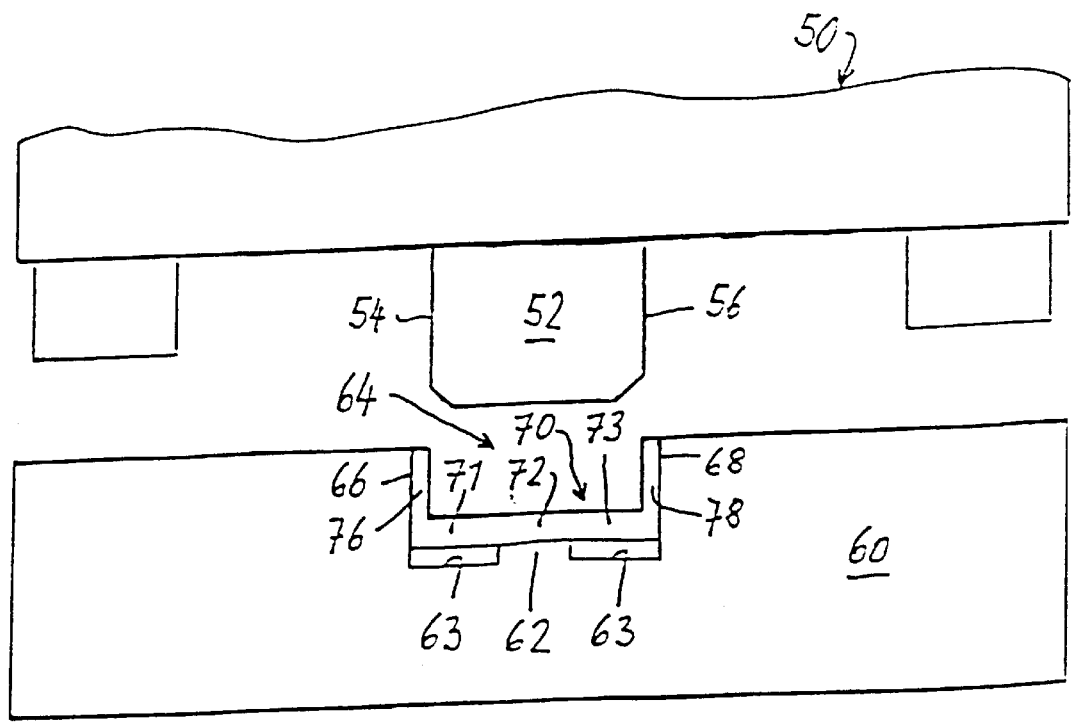
FIG. 3 a schematic representation of a second embodiment of the coupling device.

The second embodiment of the invention shown in FIG. 3 does not deviate from the above explained embodiment with respect to the reference elements for adjusting the movable coupling part relative to the machine coupling part in z-direction. On the other hand, the coupling part 50 connected to the machine is provided with a number of pins 52 similar to the coupling part 1 which are provided on either sides with prismatic reference surfaces 54, 56 which are parallel to the radius. Grooves 64 are cut into the movable coupling part 60 in correspondence to the positions of the pins 52. The bottom 63 of groove 64 has a central projection 62. An insert 70 having a U-formed cross section is held within the groove 64 by fixing the base 72 of the insert 70 to the projection 62. The opposing legs 76, 78 of the insert 70 abut the opposing flanks 66, 68 of groove 64. According to FIG. 3 the base 72 of the groove 64 has end portions 71, 73 which are suspended over the bottom 63 of groove 64. Base 72 consists of an elastic material so that the upright legs 76, 78 may yield axially under influence of a force directed in clamping direction.

Thus, legs 76 and end section 71 as well as leg 78 with end section 73 each function as a clamping plate similar to the first embodiment of the invention. Both clamping plates are connected to the coupling part 60 through their common base 72. Therefore, the functional behaviour of both clamping plates upon clamping is the same as explained above.

Figure 4:
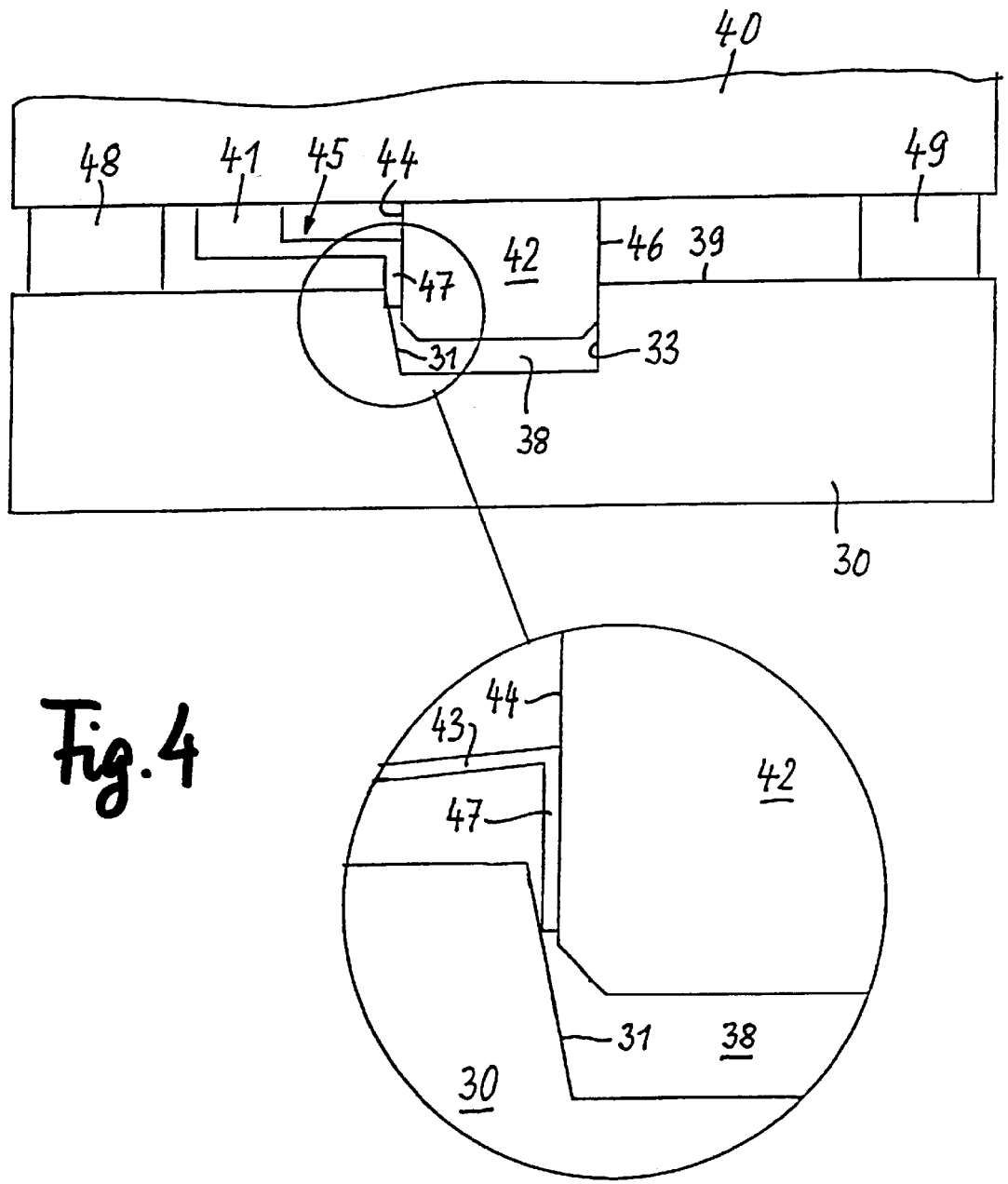
FIG. 4 a schematic representation of a third embodiment of the invention.

The third embodiment of the invention according to FIG. 4 deviates from the above substantially therein that the clamping plate 45 is mounted to the first coupling part 40 which supports pins 42 having opposite lateral surfaces 44, 46 parallel to the axis. The clamping plate 45 may be cut by electric wire erosion out of the body of the coupling part 40 or may be exchangeably mounted to the coupling part 40 by not shown screws. The clamping plate 45 consists of a block 41 connected to the coupling part 40 and of a second section 43 extending towards the lateral surface 44 and being axially elastic. The second section 43 continues into a first vertical section 47 abutting the lateral surfaces 44 and being vertically movable.

The flank 31 of the groove 38 within the second coupling part 30 which is associated to the lateral surface 44 is sloped downwardly and inwardly so that it forms a small angle with the lateral surface 44 upon clamping. The opposite flank 33 of groove 38 is parallel to the axis and forms a reference for abutment to the lateral surface 46 for positioning the coupling parts 30, 40 with respect to each other within an x-y-plane.

Upon clamping both coupling parts 30, 40, the pin 42 penetrates the associated groove 38 until the lower outer edge of the first section 47 engages flank 31. The first section 47 clamps between flank 31 and lateral surface 44 when the pin 42 continues to penetrate to the effect that the lateral surface 46 is urged against flank 33. If the pin 42 continues to penetrate a movement of section 47 along the pin 42 will take place which is possible by the axial elasticity of the second section 43. The penetration terminates when both coupling parts 30, 40 reach the exact z-position (abutment of posts 48, 49 of coupling part 40 upon the surface 39 of coupling part 30).

Figure 5:
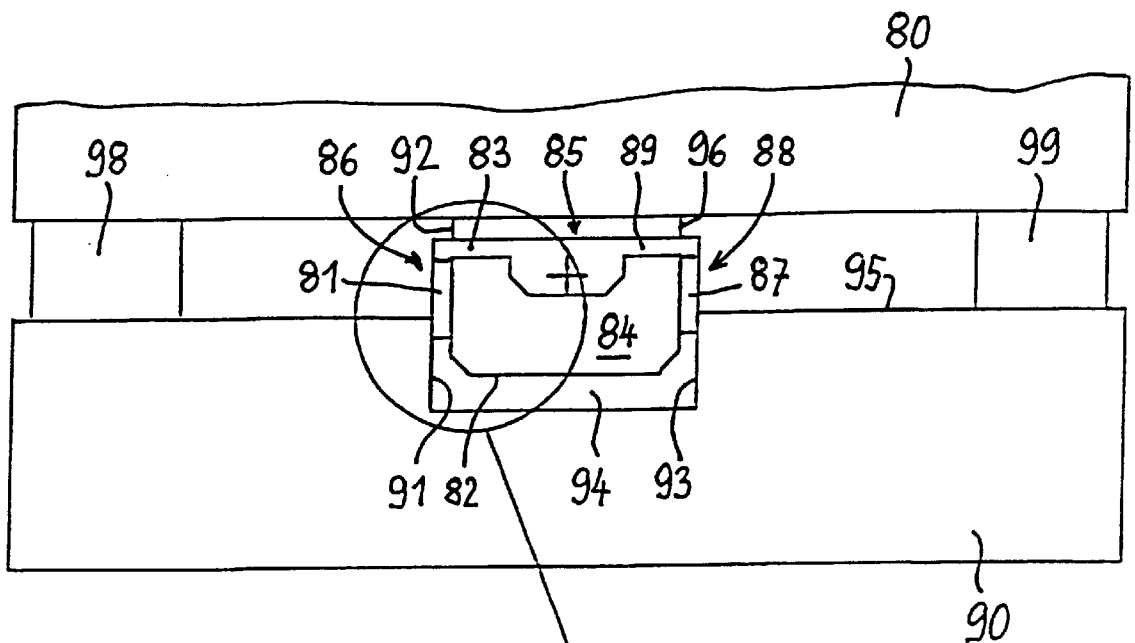
FIG. 5 a schematic representation of a fourth embodiment of the invention.
Figure 5:
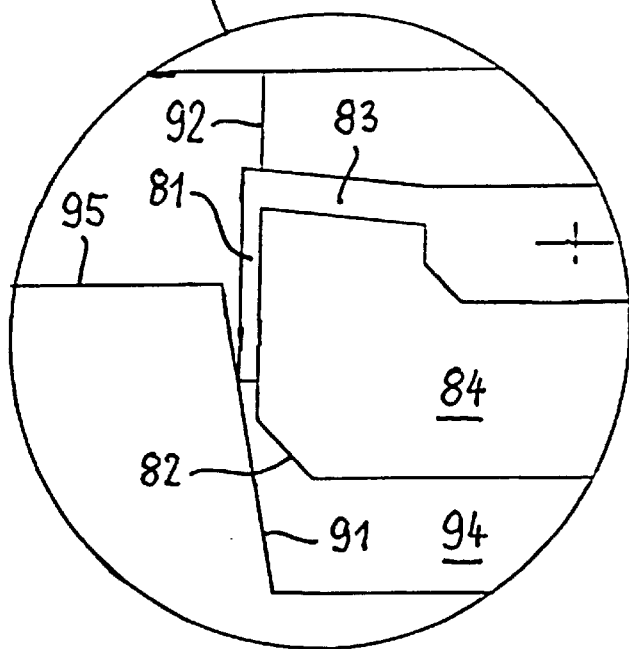

In a third embodiment of the invention shown in FIG. 5 the pin 82 of the first coupling part 80 is surrounded by an annex 85 which may be mounted to a surface 84 of pin 82 at a position marked by a cross. The first section 81 of a first clamping plate 86 extends from such annex 85 along the lateral surface 92 of pin 82 and a first section 87 of a further clamping plate 88 extends from annex 85 along the lateral surface 96 of pin 82 parallel and opposite to surface 92. Both sections 81 and 87 are vertically movable. First section 87 of clamping plate 88 is connected to the first section 81 of clamping plate 86 through second sections 89 and 83 which extend laterally and axially elastically from both ends of a thickened base mounted to surface 84. The groove 94 associated to the pin 82 has two opposing flanks 91, 93 of which the flank 91 is associated to the lateral surface 92 and the flank 93 is associated to the lateral surface 96. Everyone of both flanks 91, 93 is slightly sloped downwardly and inwardly to form a small angle with the z-axis.

Upon clamping both coupling parts 80, 90, the pin 82 penetrates the groove 94 so that the outer lower edge of first section 81 engages flank 91 and the outer lower edge of first section 87 engages the flank 93. The groove 94 is thereby centrally adjusted with respect to pin 82. As shown the first sections 81, 87 are clamped and upon further penetration of pin 82 may shift upwardly relative to the pin 82 because of the axial elasticity of the second sections 83, 89 of the clamping plates 86, 88 as shown in the enlarged detailed representation of FIG. 5. The penetration of pin 82 is terminated when the posts 98, 99 projecting from the coupling part 80 abut the upper surface 95 of the coupling part 90 and thus the z-positioning is reached.

Figure 6:
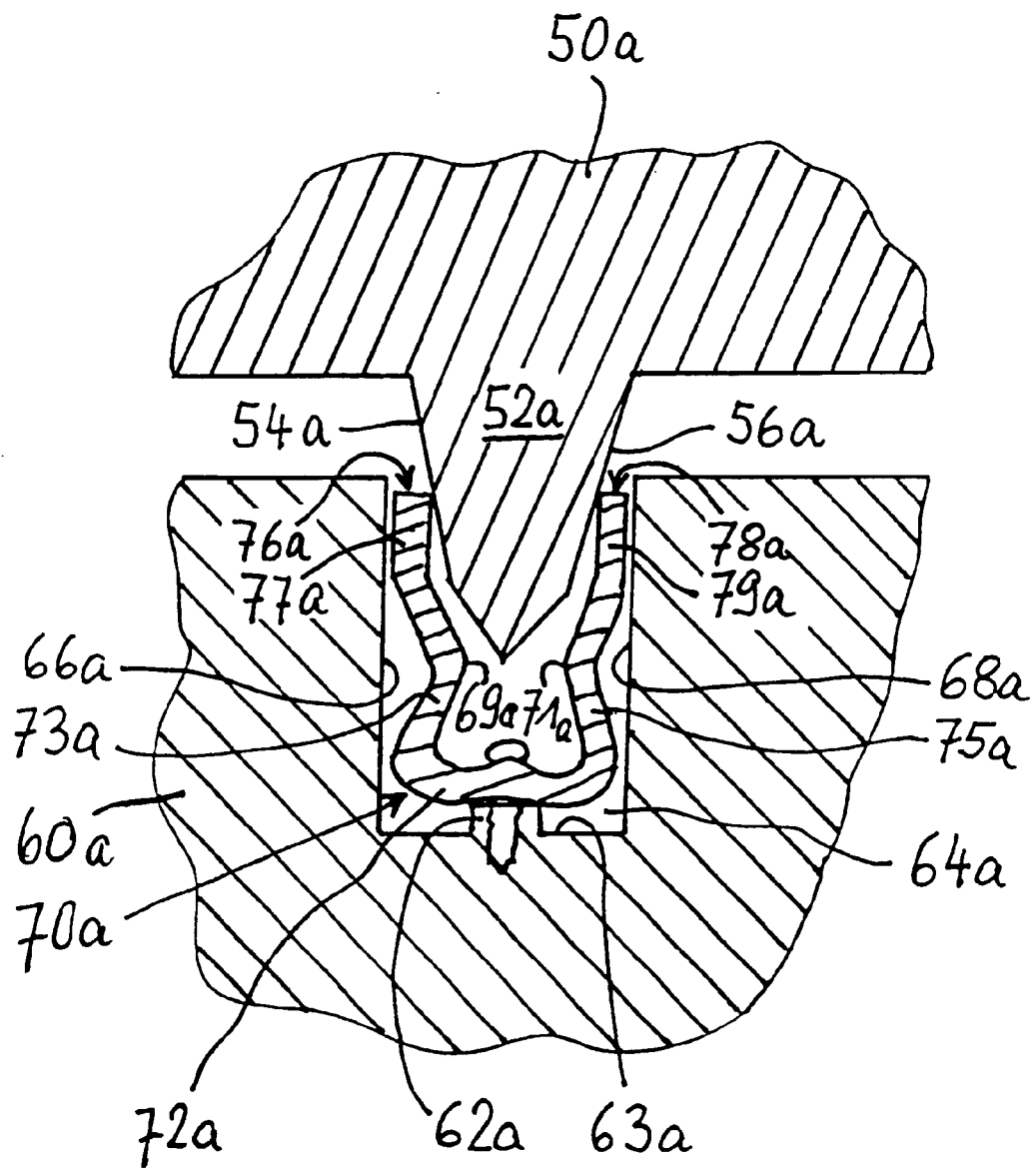
FIG. 6 a schematic representation of a detail according to a fifth embodiment of the invention.

The fifth embodiment of the invention according to FIG. 6 deviates from the second embodiment according to FIG. 3 mainly by modifying the insert 70 thereof which now has a different form and operational behaviour. Only the groove 64a of coupling part 60a with insert 70a is specifically described because the further grooves are structured in the same manner. A projection 62a is formed from the bottom 63a of the groove 64a and the center thereof upon which the base of the insert 70a is mounted. The opposing flanks 66a and 68a of the groove 64a extend parallel to the z-axis.

The insert 70a has two opposing legs 76a and 78a. Only the upper section 77a, 79a, respectively of the legs 76a, 78a which terminate in proximity to the surface of the movable coupling part 60a abut or almost abut the adjacent flanks 66a and 68a. The inner section 73a and 75a of the legs 76a and 78a, respectively connecting the upper section 77a and 79a to the base 72a of the insert 70a is buckled at 69a, 71a, respectively towards the opposing leg 78a and 76a. At least the inner section 73a and 75a is made from spring steel, in any case is axially yieldable.

Each pin projecting from the underside of the other coupling part 50a (only pin 52a associated to the groove 64a is represented in FIG. 6) comprises two opposite prismatic surfaces 54a and 56a which are parallel to the radius of the imaginary circle, and include an angle with the z-axis.

When pin 52a penetrates in the groove 64a upon clamping of the coupling parts 50a and 60a the prismatic lateral surfaces 54a, 56a engage the upper inner edge of each upper section 77a, 79a and adjust the groove 64a (and thereby the coupling part 60a) to the coupling part 50a. When continuing clamping the pin 52a shifts the upper section 76a, 78a which now abut flanks 66a, 68a into the groove 64a until the mentioned posts of the coupling part 50a abut the upper surface of coupling part 60a. Simultaneously the inner sections 73a and 75a buckle at 69a and 71a elastically. The legs 76a and 78a remain clamped between pin 52a and flanks 66a and 68a. Thus, each leg 76a and 78a forms a clamping plate which is axially elastical by forming inwardly extending buckles 69a, 71a thereon.

According to FIG. 6 the base 72a of insert 70a is screwed upon projection 62a. Thus, by removing the screw insert 70a may be exchanged by another similar insert which again may be screwed upon projection 62a.

What is claimed is:

1. A coupling device comprising a first coupling part having a first coupling part surface, a second coupling part having a second coupling part surface, and clamping means for releasably clamping said first coupling part with said second coupling part in a clamping direction that defines an axial direction and with said first and second coupling part surfaces facing each other, said second coupling part having at least two grooves spaced circumferentially and non-parallel with respect to each other, each of said at least two grooves formed from said second coupling part and extending in said axial direction from said second coupling part surface and defining a groove flank surface, said first coupling part including at least two pins projecting from said first coupling part surface, the number of pins equal to the number of grooves, each of said pins having opposed lateral surfaces, each said pin disposed to engage within said groove upon clamping, at least one of said lateral surfaces of each said pin disposed at an angle with respect to said groove flank surface, said clamping means including at least one clamping plate extending within each groove, each said at least one clamping plate having a clamping plate surface extending along the axial direction of clamping, each said clamping plate being wedged between said groove flank surface and said lateral surface of said pin within said groove, each said clamping plate connected to one of said first and second coupling parts to move axially and elastically within said groove, wherein said at least one of said lateral surfaces of each said pin that is disposed at an angle with respect to said groove flank surface engages said clamping plate and said clamping plate surface engages with said groove flank surface, said clamping plate surface, is slidably engaged in the axial direction with said groove flank surface to wedge the pin within the groove without deforming the clamping plate where the clamping plate engages with said pin, the engagement between said clamping plate, said pin and groove flank surface forming a reference within a plane perpendicular to the axial clamping direction.

2. Device according to claim 1 wherein each said clamping plate is fixedly mounted to one of said first and second coupling parts and is integral therewith.

3. Device according to claim 1 wherein each said clamping plate is exchangeably connected to one of said first and second coupling parts.

4. Device according to claim 1 wherein each said clamping plate has a first section that defines said clamping plate surface and a second section connected to the first section and being mounted yieldably to one of said first and second coupling parts.

5. Device according to claim 1 wherein each said clamping plate has a first section movably abutting the groove flank surface and a second section being axially elastic.

6. Device according to claim 4 wherein said first section extends substantially perpendicular to one of said first and second coupling part surfaces and said second section extends substantially parallel to one of said first and second coupling part surfaces.

7. Device according to claim 6, wherein each groove includes an undercut adjacent said groove flank surface, said second section extending into said undercut.

8. A coupling device comprising a first coupling part, a second coupling part, and clamping means for releasably clamping said first coupling part with said second coupling part in a clamping direction that defines an axial direction, at least one of said first and second coupling parts having at least two grooves formed from a coupling part surface and spaced circumferentially and non-parallel with respect to each other, the other of said first and second coupling parts including at least two pins projecting from a coupling part surface, each of said pins having opposed lateral surfaces, said pins disposed to engage with said grooves upon clamping, at least one of said lateral surfaces of each pin disposed at an angle with respect to an associated groove flank surface of said grooves, said clamping means comprises clamping plates each having a clamping plate surface respectively extending along the axial direction, each said clamping plate extending within each groove between the groove flank surface and said angled lateral surface of the pin that engages within said groove, each said clamping plate connected to one of said first and second coupling parts so as to move axially and elastically, said clamping plate, pin and groove flank surface forming a reference within a plane perpendicular to the axial direction, and wherein each said clamping plate is an insert mounted within each said groove, said insert including a base fixed to a projection of the bottom of the groove.

9. Device according to claim 8 wherein the insert has a substantially U-shaped cross section.

10. Device according to claim 8 wherein each said clamping plate is mounted with a pin.

11. A coupling device comprising a first coupling part, a second coupling part, and clamping means for releasably clamping said first coupling part with said second coupling part in a clamping direction that defines an axial direction, at least one of said first and second coupling parts having at least two grooves formed from a coupling part surface and spaced circumferentially and non-parallel with respect to each other, the other of said first and second coupling parts including at least two pins projecting from a coupling part surface, each of said pins having opposed lateral surfaces, said pins disposed to engage with said grooves upon clamping, at least one of said lateral surfaces of each pin disposed at an angle with respect to an associated groove flank surface of said grooves, said clamping means comprises clamping plates each having a clamping plate surface extending along the axial direction, each said clamping plate extending within each groove between a groove flank surface and said angled lateral surface of the pin that engages within said groove, each said clamping plate connected to one of said first and second coupling parts so as to move axially and elastically, said clamping plate, pin and groove flank surface forming a reference within a plane perpendicular to the axial direction, and wherein each said clamping plate has a first section movably abutting the groove flank surface and a second section being axially elastic, and wherein said first section includes an inwardly extending buckle, each said clamping plate including a base mounted to said second coupling part within the groove.

12. A coupling device comprising a first coupling part having a first coupling part surface, a second coupling part having a second coupling part surface, and clamping means for releasably clamping said first coupling part with said second coupling part in a clamping direction that defines an axial direction and with said first and second coupling part surfaces facing each other, said second coupling part having at least two grooves spaced circumferentially and non-parallel with respect to each other, each of said at least two grooves formed from said second coupling part and extending in said axial direction from said second coupling part surface and defining groove flank surfaces, said first coupling part including at least two pins projecting from said first coupling part surface, the number of pins equal to the number of grooves, each of said pins having opposed lateral surfaces, each of said pins disposed to engage within a groove upon clamping, at least one of said lateral surfaces of each of said pins disposed at an angle with respect to at least one of said groove flank surfaces, said clamping means including two clamping plates extending within each groove, each of said clamping plates having a clamping plate surface extending along the axial direction of clamping, each of said two clamping plates being wedged between at least one of said groove flank surfaces and at least one of said lateral surfaces of said pin within said groove, wherein the clamping plate surface engages the groove flank surface, each of said two clamping plates connected to one of said first and second coupling parts to move axially and elastically within said groove, wherein said at least one of said lateral surfaces of each said pin that is disposed at an angle with respect to said groove flank surface engages at least one of said clamping plates for moving a clamping plate surface into engagement with said at least one of said groove flank surfaces and for moving a clamping plate surface in the axial direction in slidable engagement with said at least one of said groove flank surfaces to wedge the pin within the groove without deforming the clamping plate where the clamping plate engages with said pin, the engagement between said clamping plate, said pin and groove flank surface forming a reference within a plane perpendicular to the axial clamping direction.

\* \* \* \* \*